(12) United States Patent
Stojanovski

(10) Patent No.: US 6,708,422 B1
(45) Date of Patent: Mar. 23, 2004

(54) SAW GUIDE

(76) Inventor: Dimitrije Stojanovski, 13300 W. Star Dr., Shelby Twp., MI (US) 48315

( * ) Notice: Subject to any disclaimer, the term of this patent is extended or adjusted under 35 U.S.C. 154(b) by 0 days.

(21) Appl. No.: 10/161,177

(22) Filed: Jun. 4, 2002

(51) Int. Cl.$^7$ .............................. B43L 7/12; B43L 13/00
(52) U.S. Cl. .................. 33/640; 33/471; 33/42
(58) Field of Search ........................... 33/640, 42, 452, 33/465, 466, 471, 472, 495, 500, 534, 562

(56) References Cited

U.S. PATENT DOCUMENTS

| | | | | |
|---|---|---|---|---|
| 1,979,567 A | * | 11/1934 | Nicholson | 33/458 |
| 2,773,523 A | * | 12/1956 | Hopla | 33/403 |
| 3,124,176 A | * | 3/1964 | Vogini | 33/500 |
| 3,645,307 A | | 2/1972 | Stocker | |
| 4,611,407 A | * | 9/1986 | van Gorp | 33/471 |
| 4,843,728 A | * | 7/1989 | Francis | 33/640 |
| 4,901,444 A | * | 2/1990 | Maschmeier | 33/423 |
| 5,035,061 A | | 7/1991 | Bradbury et al. | 33/430 |
| 5,103,566 A | * | 4/1992 | Stebe | 33/42 |
| 5,388,338 A | * | 2/1995 | Majors | 33/376 |
| 5,539,991 A | * | 7/1996 | Harrison | 33/471 |
| 5,603,164 A | * | 2/1997 | Haddix | 33/456 |
| 6,141,882 A | * | 11/2000 | Syken | 33/471 |

* cited by examiner

Primary Examiner—Christopher W. Fulton
(74) Attorney, Agent, or Firm—Charles W. Chandler

(57) ABSTRACT

A saw guide for guiding hand-held power saws of the type having a moving blade and a parallel guide edge used for cutting sheet and stock material. The saw guide includes a fixed arm of L-shaped cross-section comprising respective horizontal and vertical legs. The horizontal leg rests on the upper surface of the material with the vertical leg extending downwardly to engage an edge of the material. The fixed leg is affixed to the material using a C-clamp which clamps the horizontal leg to the material. An elongate variable angle arm also of L-shaped cross-section comprising respective horizontal and vertical legs is pivotally connected to the fixed arm by an adjustable angle locking assembly. The horizontal leg of the variable angle leg rests on the surface of the material with the vertical leg extending upwardly to form an elongate, straight saw guide surface for guiding the power saw. The adjustable angle locking assembly pivotally interconnects the fixed arm and the variable angle arm for rotation about a common pivot axis. The locking assembly is lockable with the fixed arm and the variable angle arm in a plurality of angular positions indicated on an angle indicia.

20 Claims, 6 Drawing Sheets

SAW GUIDE

BACKGROUND OF THE INVENTION

1. Field

The invention relates to an improved guide device for power tools, and more particularly to a guide device for power saws to make straight cuts in sheet and stock materials at a desired angle relative to the edge of the material.

2. State of the Art

Portable power saws are used to cut sheet materials such as plywood and wallboard used to build houses and other such wooden structures. It is desirous that the saw cuts be straight and at a desired angle.

Various guide devices have been designed to produce straight saw cuts. For example, U.S. Pat. No. 5,035,061 issued to Bradbury et al. discloses a guide for hand-held power tools for cutting sheet material. U.S. Pat. No. 3,645,307, issued to Stocker, discloses a power saw guide which includes a base frame adapted to be secured to a worktable. The frame has a guide rail adapted for adjustment about a vertical axis. A saw carriage is supported by rollers on the guide rail for longitudinal movement therealong. A guide roller on the carriage is adjustable to permit the carriage to be leveled relative to the worktable.

U.S. Pat. No. 5,206,999, issued to Stone discloses a device comprising a combination saw guide and surface protector for use with hand operated, power circular saws to make precise cuts in very large sheets of plywood paneling and wallboard.

SUMMARY OF THE INVENTION

The present invention is a saw guide for use with hand-held power saws of the type having a moving blade and a parallel guide edge used for cutting sheet and stock material. The saw guide is affixable on the upper surface of the material using a C-clamp, to guide the power saw when cutting the material. The saw guide comprises a fixed arm, at least one elongate variable angle arm, and an adjustable angle locking assembly. The fixed arm rests on the upper surface of the material and engages the edge of the material. The fixed arm includes a straight edge section adapted to abut against and be clamped to the edge of the material using the C-clamp. The variable angle arm rests on the upper surface of the material, and has an elongate, straight saw guide surface adapted to engage the guide edge of the power saw when cutting the material. The adjustable angle locking assembly pivotally interconnects the fixed arm and the variable angle arm for rotation about a common pivot axis. The locking assembly is lockable with the fixed arm and the variable angle arm in a plurality of angular positions indicated on an angle indicia thereof.

DESCRIPTION OF THE DRAWINGS

The best mode presently contemplated for carrying out the invention is illustrated in the accompanying drawings, in which.

DETAILED DESCRIPTION OF THE ILLUSTRATED EMBODIMENTS

Figure 1:
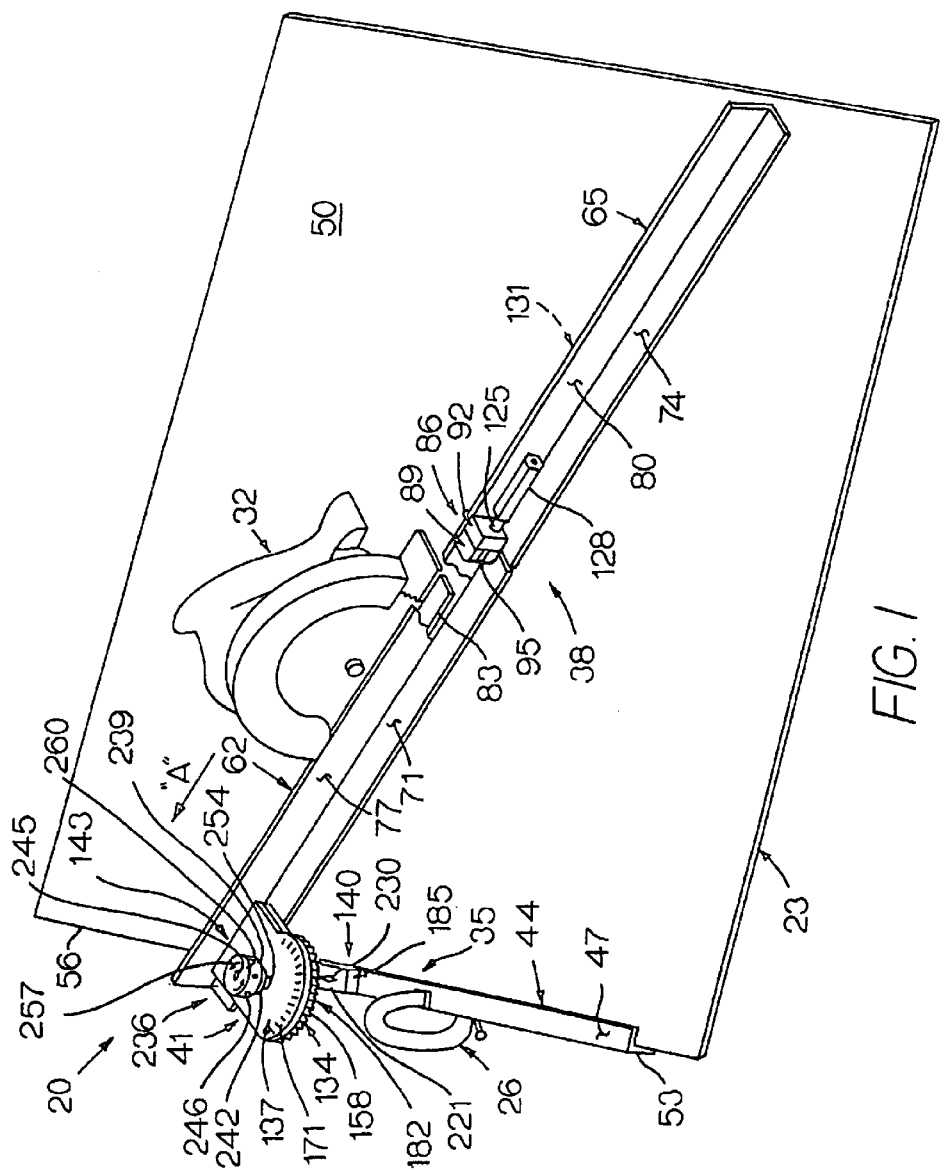
FIG. 1 is a perspective view of an exemplary saw guide in accordance with the present invention, as mounted to a sheet of plywood and used with a circular saw, the saw guide being partially broken.

FIG. 1 shows an exemplary saw guide in accordance with the present invention, designated generally at 20, as affixed to a plywood or wallboard sheet 23 using a C-clamp 26, to guide a circular saw 32 to cut plywood sheet 23 as shown by arrow "A".

Figure 2:
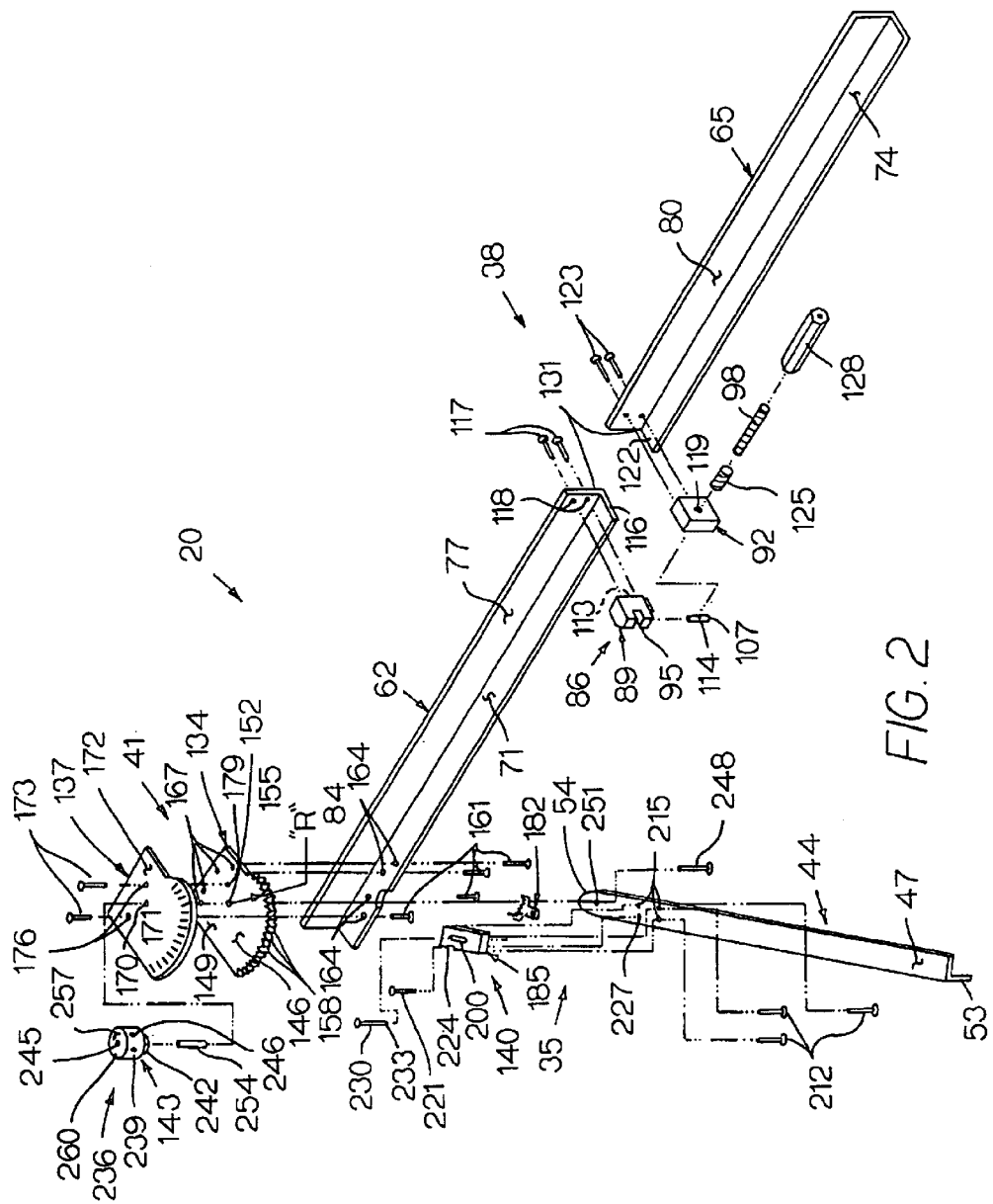
FIG. 2 an exploded view of the saw guide comprising a fixed arm assembly and a variable angle arm assembly interconnected by an adjustable angle locking assembly.

FIG. 2 shows saw guide 20 which comprises a fixed arm assembly 35 and a collapsible, variable angle arm assembly 38 interconnected by an adjustable angle locking assembly 41. The fixed arm assembly 35 includes an elongate fixed arm 44 of an L-shaped cross-section having a horizontal leg 47 adapted to rest on an upper surface 50 of the plywood sheet 23, and a downwardly dependent vertical leg 53 adapted to engage an edge 56 of plywood sheet 23. A clamp-receiving slot 59 is disposed along vertical leg 53 to provide clearance for C-clamp 26. A rounded end 54 of the horizontal leg 47 extends longitudinally slightly beyond vertical leg 53.

Figure 3:
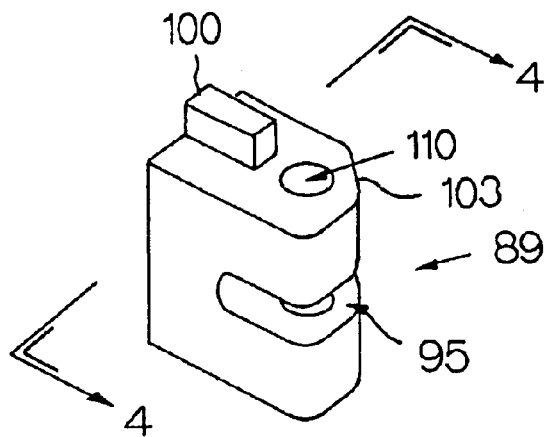
FIG. 3 a perspective view of a pivot block of the variable angle arm assembly.
Figure 4:
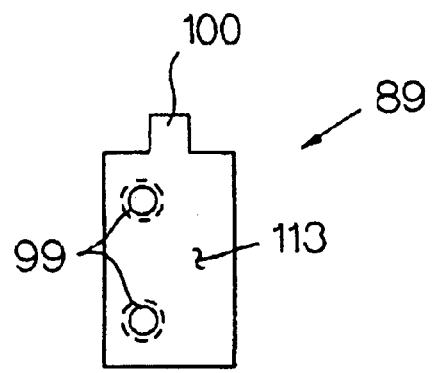
FIG. 4 a lateral vertical sectional view taken on the line 4—4 of FIG. 3 showing respective mounting holes thereof.

Arm assembly 38 includes a pair of elongate movable inner and outer arms 62 and 65 of the same L-shaped cross-section as fixed arm 44, having respective horizontal legs 71 and 74 adapted to rest on the upper surface 50 of plywood sheet 23, and respective upwardly dependent vertical legs 77 and 80 adapted to engage a guide edge 83 of saw 32 when cutting plywood sheet 23. Horizontal leg 71 of inner arm 62 includes a rounded cutout 84 for receiving the rounded end 54 of the horizontal leg 47 when assembled together to permit rotational movement therebetween. Arm assembly 38 further includes a hinge assembly 86 which pivotally and lockably interconnects inner and outer movable arms 62 and 65, in an extended position for use and a collapsed position for storage. Hinge assembly 86 includes respective pivot end fixed blocks 89 and 92, each being of a generally rectangular configuration. Pivot block 89 includes a central notch 95 adapted to receive a threaded stud 98, and a pair of threaded mounting holes 99. A spacer tab 100 spaces pivot block 89 slightly away from horizontal leg 71, which along with an angled surface 103 of pivot block 89 facilitate locking and pivoting of hinge assembly 86 (FIGS. 3 and 4). Stud 98 is pivotally connected to pivot block 89 by a pin 107 that extends through a transverse bore 110 extending from an inner side 113 of pivot block 89. Pin 107 includes a transverse centrally located threaded hole 114 into which stud 98 is threaded and affixed using a liquid securing or adhesive compound. Pivot block 89 is affixed to inner arm 62 extending past an end edge 116 thereof using a pair of flat head screws 117 which extend through respective countersunk holes 118 through inner arm 62, and engage threaded holes 99 of pivot block 89.

Fixed block 92 includes a central hole 119 to receive stud 98, and a pair of threaded mounting holes 120. Fixed block 92 is affixed to outer arm 65 inwardly of an end edge 122 using a pair of flat head screws 123. Screws 123 extend through a pair of countersunk holes 124 through outer arm 65 and thread into threaded mounting holes 120. Fixed block 92 is spaced inwardly from end edge 122 a distance equal to that by which pivot block 89 extends past the edge 116 of inner arm 62.

A compression spring 125 is disposed about threaded stud 98, being compressed against fixed block 92 by an elongate hexagonal nut 128 which threads onto and which is adjustable by hand on threaded stud 98. Spring 125 retains hinge assembly 86 in the locked position with outer arm 65 extended, abutting end edges 116 and 122. The overlapping of pivot block 89 and fixed block 92 provide an elongate, straight saw guide surface 131. Spring 125 also permits pivoting of the hinge assembly 86.

Locking assembly 41 comprises a gear plate 134, an angle indicator plate 137, an indexing gear assembly 140, and a knob assembly 143. Gear plate 134 includes an arcuate toothed portion 146 and a dependent attachment portion 149. Toothed portion 146 has a centrally disposed main pivot hole 152 and a convex outer toothed area 155 comprising a plurality of teeth 158 disposed at a radius"R" from main pivot hole 152. Gear plate 134 mounts to the inner movable arm 62 using a plurality of flat head screws 161 that extend through respective countersunk holes 164 disposed through inner movable arm 62. Screws 161 engage respective threaded holes 167 disposed through gear plate 134. An angle indicator plate 137 is of the same outer shape as the gear plate 134, but without the teeth 158. Plate 137 has a corresponding main pivot hole 170 therethrough.

An indicia 171 disposed on a front surface 172 of angle indicator plate 137 and radially disposed about main pivot hole 170 shows the angular relationship of variable angle arm assembly 38 relative to fixed arm assembly 35 and edge 56 of plywood sheet 23. Angle indicator plate 137 mounts to gear plate 134 using a pair of flat head screws 173. Screws 173 extend through respective countersunk holes 176 disposed through angle indicator plate 137 to engage respective threaded holes 179 through gear plate 134.

Figure 5:
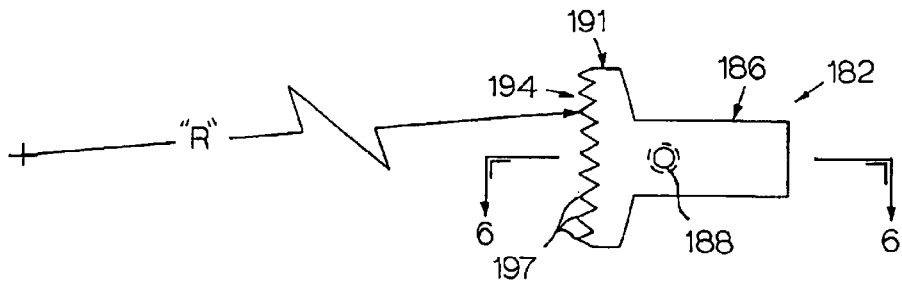
FIG. 5 a top plan view of a T-shaped gear section of the adjustable angle locking assembly.
Figure 6:
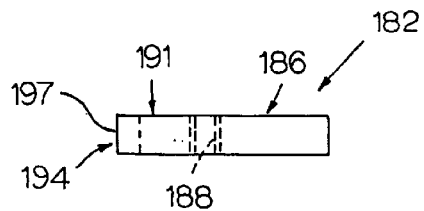
FIG. 6 a longitudinal vertical sectional view taken on the line 6—6 of FIG. 5 showing a threaded hole therethrough.

Referring to FIGS. 5–8, indexing gear assembly 140 includes a T-shaped gear section 182 and a gear section retention block 185. Gear section 182 includes a body 186 having a threaded hole 188 which extends therethrough, and a transverse gear portion 191 having a concave outer toothed area 194 comprising a plurality of teeth 197 (FIGS. 5 and 6). Teeth 197 are disposed at radius"R" corresponding to teeth 158 of gear plate 134.

Figure 7:
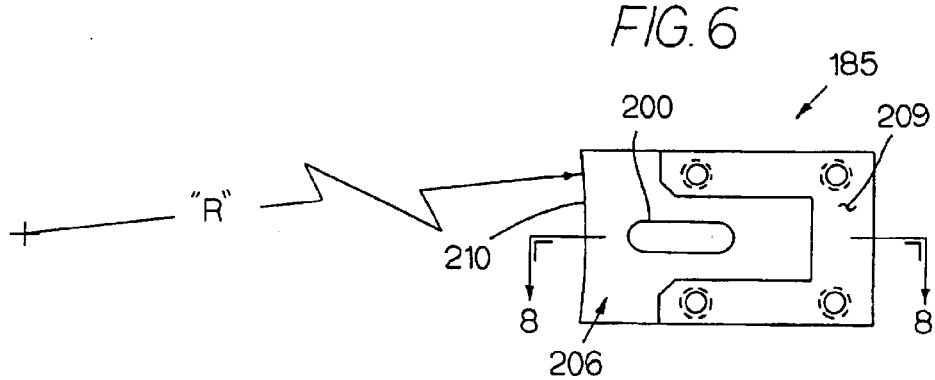
FIG. 7 a bottom plan view of a gear section retention block of the adjustable angle locking assembly.
Figure 8:
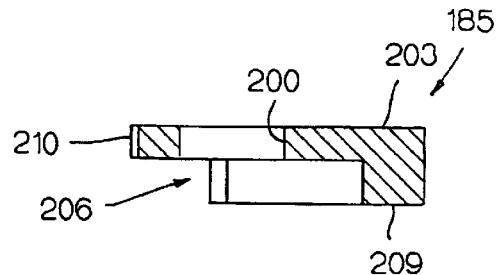
FIG. 8 a longitudinal vertical sectional view taken on the line 8—8 of FIG. 7 showing a central slot and an elongate gear section receiving opening therein.

Retention block 185 includes a central slot 200 which extends through an outer face 203 to an elongate gear section receiving opening 206 which extends inwardly from an inner face 209 of retention block 185 (FIGS.7 and 8). An arcuate surface 210 of retention block 185 has a radius"R" corresponding to gear plate 134. The retention block 185 mounts to the horizontal leg 47 of fixed arm 44 using a plurality of flat head screws 212. Screws 212 extend through respective countersunk holes 215 through horizontal leg 47 into respective threaded holes 218 of retention block 185.

A socket head screw 221 extends oppositely through a counterbored hole 224 of retention block 185 into a threaded hole 227 of horizontal leg 47. Body 186 of gear section 182 slidably fits into opening 206 when retention block 185 is mounted to horizontal leg 47, and is movable inwardly, outwardly, and slightly laterally tiltably therewithin for alignment with gear plate 134. A round head screw 230 extends through central slot 200 of retention block 185 and threads through threaded hole 188 of gear section 182. A distal end 233 of screw 230 contacts horizontal leg 47 of fixed arm 44 to force gear section 182 outwardly against retention block 185 to retain a desired position of gear section 182 within opening 206.

Fixed arm assembly 35 assembles to adjustable angle locking assembly 41 with attached variable angle arm assembly 38 using a hand knob 236 of the knob assembly 143 which includes a knurled gripping portion 239 and a coaxial stem portion 242. A left-hand threaded hole 245 extends through hand knob 236 for receiving a mating left hand threaded flat head bolt 248. A plurality of tightening bores 246 extend radially into gripping portion 239 for insertion of a tightening rod (not shown) to tighten down hand knob 236 if additional tightening force is desired.

Bolt 248 extends through a countersunk hole 251 through horizontal leg 47 of fixed arm 44, main pivot hole 152 of the gear plate 134, and main pivot hole 170 of angle indicator plate 137, and into threaded hole 245 of hand knob 236.

A compression spring 254 of knob assembly 143 is disposed between angle indicator plate 137 and hand knob 236 to permit axial movement of indexing gear assembly 140 away from gear plate 134 to disengage teeth 158 and 197 to change the angle of adjustable angle locking assembly 41 without loosening knob 236. An indicia 257 on a front surface 260 of hand knob 236 indicates the locking direction of hand knob 236.

Figure 9:
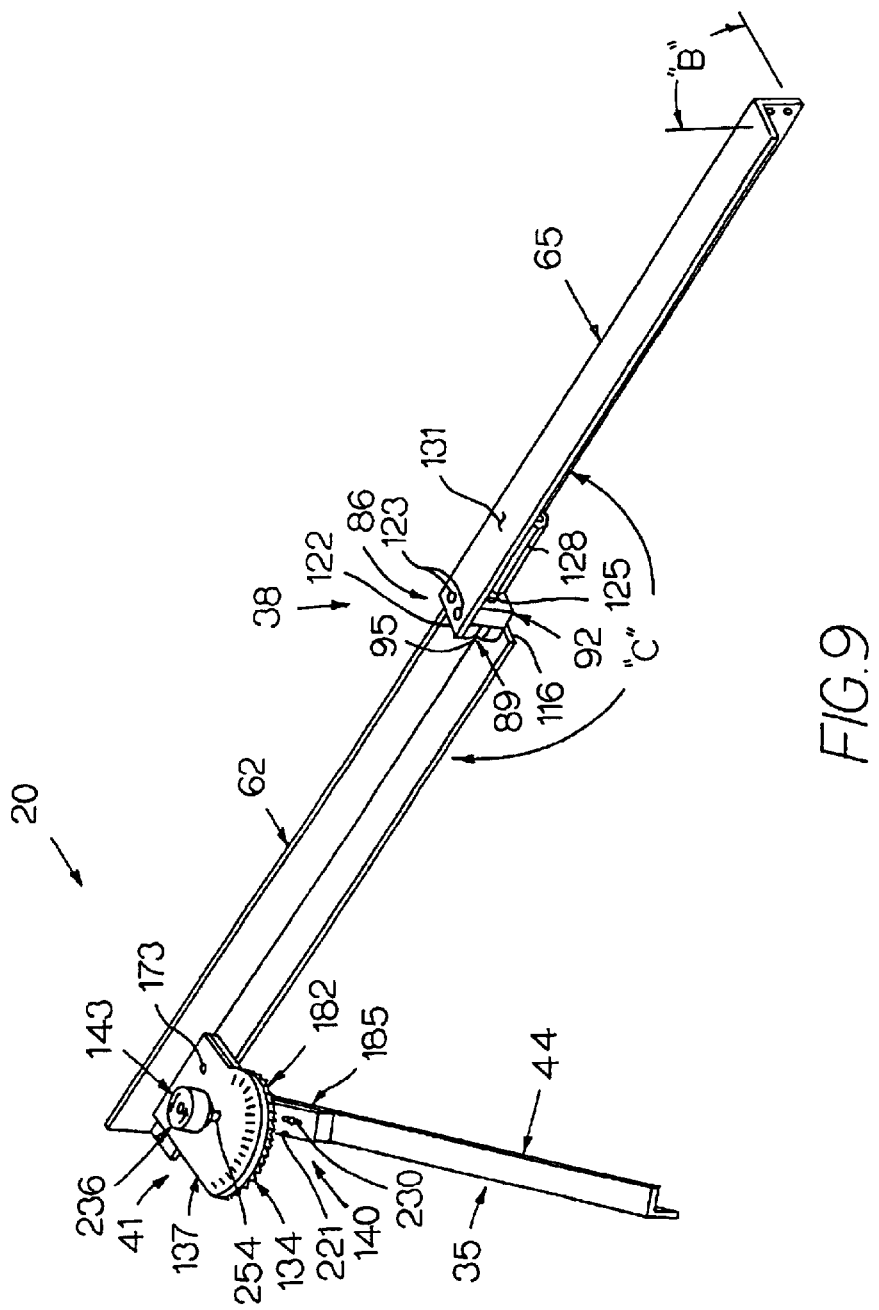
FIG. 9 a perspective view of the saw guide in a partially collapsed position.
Figure 10:
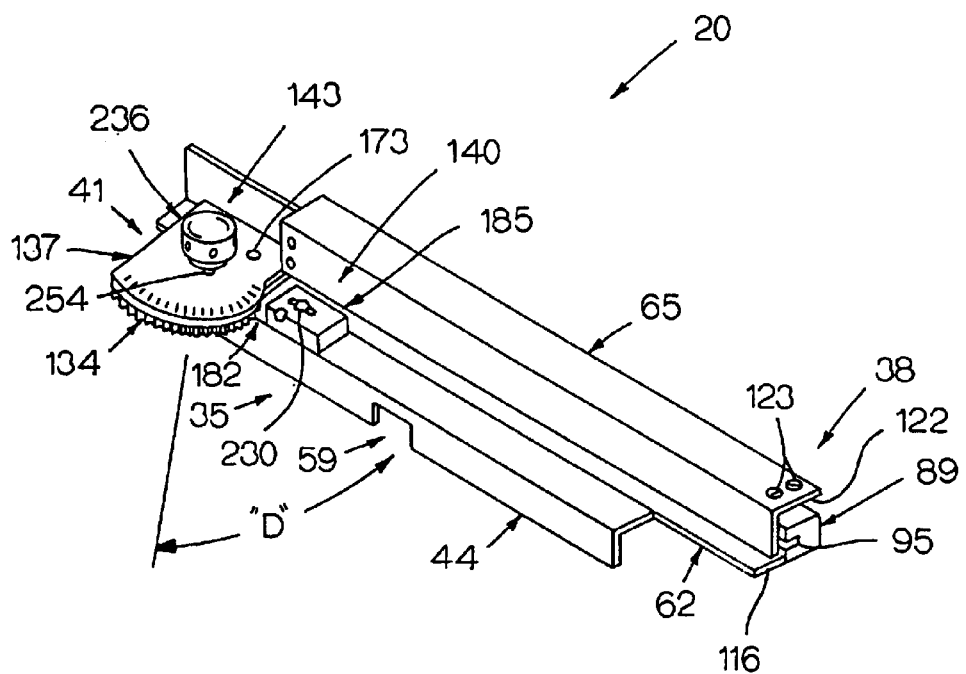
FIG. 10 a perspective view of the saw guide in a completely collapsed position for compact storage.

Referring to FIGS. 9 and 10, saw guide 20 may be folded to a more compact, collapsed position. This is a two step process wherein the extended variable angle arm assembly 38 is folded, then the fixed arm assembly 35 folded. The first step is accomplished by rotating outer arm 65 from the position shown in FIG. 1 to that shown in FIG. 9 (Arrow "B"), then folding inwardly to the position shown in FIG. 10 (Arrow "C"). Likewise, fixed arm assembly 35 is rotated inwardly to the position shown in FIG. 9 (Arrow "D") by forcing fixed arm assembly 35 axially away from adjustable angle locking assembly 41 with attached variable angle arm assembly 38 against compression spring 254. This axial movement positions the indexing gear assembly 140 away from gear plate 134 to disengage teeth 158 and 197 to permit changing the angle of adjustable angle locking assembly 41 without loosening knob 236.

Whereas this invention is illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

Having described our invention, we claim:

1. A saw guide for use with a hand-held power saw of the type having a moving blade and a parallel guide edge used for cutting sheet and stock material having an upper surface and an outer edge, the saw guide being affixable on the upper surface of the material using a clamp, the saw guide being used to guide the power saw when cutting the material, comprising:

a first arm (44) intended to rest on the upper surface of a sheet of material and to engage the edge of the material, said first arm having a straight edge section adapted to abut the edge of the material;

an elongated variable angle second arm (62) intended to rest on the upper surface of the material, said second arm having an elongated, straight saw guide surface for engaging an edge of a power saw when cutting the material;

an elongated variable third angle arm (65) intended to rest on the upper surface of the material, said third arm having an elongated, straight saw guide surface for engaging an edge of the power saw when cutting the material;

a first locking device pivotally connecting an outer end of said second arm and an inner end of the third arm for pivotal motion about a common pivot axis toward either a first position in which the third arm forms a linear extension of the second arm, or a second position in which the third arm is disposed parallel to the second arm; and a second locking device pivotally connecting an inner end of the first arm to an inner end of the second arm, such that the first arm is pivotal toward either a first position in which the first arm is disposed at a selected angular position with respect to the second arm or a second position in which the first arm is parallel to both the second arm and the third arm.

2. A saw guide according to claim 1, wherein the adjustable angle locking assembly comprises an interlocking gear plate and an indexing member, one end thereof being affixed to an end portion of the fixed arm and another end thereof being affixed to an end portion of the variable angle arm, said gear plate having an arcuate toothed portion comprising a plurality of teeth, said teeth being disposed at a substantially constant radius from a common pivot axis, said indexing member having a toothed portion comprising at least one tooth, said teeth of said gear plate and said indexing member being adapted to mesh together in a plurality of predetermined angular positions of said fixed and variable position arms about the common pivot axis.

3. A saw guide as claimed in claim 2, wherein a main pivot hole extends through the gear plate coaxial with the common pivot axis, and another main pivot hole extends through the end portion of the arm to which the indexing member is affixed also coaxial with said common pivot axis, said gear plate and said end portion of said arm having said main pivot hole being retained together by a main pivot bolt which extends through said main pivot holes and which is secured by a hand knob having a mating internally threaded hole.

4. A saw guide as claimed in claim 3, further comprising a compression spring disposed along the main pivot bolt partially compressed against the hand knob to retain the gear plate and the indexing gear in contact, but permitting upon application of hand force, first axial and then relative rotational movement of said gear plate and said indexing member to facilitate changing between the predetermined angular positions without loosening said hand knob.

5. A saw guide as claimed in claim 3, further comprising an angle indicator plate which is of a same general outer shape as the gear plate, but without the teeth, and having a corresponding main pivot hole therethrough, said angle indicator plate having indicia disposed on a front surface thereof radially disposed about a main pivot hole, said indicia indicating angular relationship of the variable angle arm assembly relative to the fixed arm assembly and edge of the material.

6. A saw guide according to claim 2, wherein the indexing member comprises a T-shaped gear section having a body and a transverse gear portion having a concave outer toothed area having a plurality of teeth disposed at such a radius as to mate with the teeth of the gear plate.

7. A saw guide according to claim 6, wherein a main pivot hole extends through the gear plate coaxial with the common pivot axis, and another main pivot hole extends through the end portion of the arm to which the indexing member is affixed also coaxial with said common pivot axis, said gear plate and said end portion of said arm having said main pivot hole being retained together by a main pivot bolt which extends through said main pivot holes and which is secured by a hand knob having a mating internally threaded hole.

8. A saw guide as claimed in claim 7, further comprising a compression spring disposed along the main pivot bolt and partially compressed against the hand knob to retain the gear plate and the indexing gear in contact, but permitting upon application of hand force, first axial and then relative rotational movement of said gear plate and said indexing member to facilitate changing between the predetermined angular positions without loosening said hand knob.

9. A saw guide as claimed in claim 7, further comprising an angle indicator plate which is of a same general shape as the gear plate but without the teeth, and having a corresponding main pivot hole therethrough, said angle indicator plate having the angle indicia disposed on a front surface thereof radially disposed about said main pivot hole adjacent said teeth.

10. A saw guide according to claim 6, wherein the body of the T-shaped gear section includes a threaded hole which extends therethrough, and further comprising a gear section retention block which includes a central opening that extends through an outer face of said gear section retention block into a gear section receiving opening which extends inwardly from an inner face of retention block, said gear section retention block which mounts to a horizontal leg of the fixed arm, said body of said gear section slidably fitting into said gear section receiving opening and being movable inwardly and outwardly therewithin, an externally threaded member being disposed through said central opening of said retention block to threadably engage and extend through said threaded hole of said gear section such that a distal end of said externally threaded member contacts said horizontal leg of said fixed arm to force said gear section outwardly against said gear section retention block to retain a desired position of the gear section within said opening.

11. A saw guide according to claim 2, wherein the gear plate is affixed to the variable angle arm, and the indexing member is affixed to the fixed arm.

12. A saw guide according to claim 11, wherein there are at least a pair of variable angle arms comprising respective inner and outer variable angle arms hingedly connected together by a hinge assembly, said inner variable length arm being connected to the adjustable angle locking assembly, said variable angle arms having an extended position locked end-to-end forming a substantially continuous vertical saw guide surface to engage the guide edge of the power saw while cutting the material, and a collapsed position wherein said variable angle arms are disposable in a generally parallel position for storage.

13. A saw guide according to claim 1, wherein there are at least a pair of variable angle arms comprising respective inner and outer variable angle arms hingedly connected together by a hinge assembly, said inner variable length arm being connected to the adjustable angle locking assembly, said variable angle arms having an extended position locked end-to-end to form a substantially continuous vertical saw guide surface to engage the guide edge of the power saw while cutting the material, and a collapsed position wherein said variable angle arms are disposable in a generally parallel position for storage.

14. A saw guide according to claim 13, wherein the variable angle arms each have a generally L-shaped cross-section, and respective horizontal legs adapted to rest on the upper surface of the material and respective upwardly dependent vertical legs adapted to engage the guide edge of the power saw while cutting the material, and wherein the fixed arm has a generally L-shaped cross-section, said fixed arm having a horizontal leg adapted to rest on the upper surface of the material and a downwardly dependent vertical leg adapted to engage the edge of the material, the hinge assembly being adapted to fold said inner and outer legs by longitudinally twisting said outer leg ninety degrees relative to said inner leg, then folding said outer leg back parallel to said inner leg.

15. A saw guide according to claim 14, wherein the hinge assembly includes respective ends of the inner and outer arms which are adapted to interlock in a linearly extended position, a threaded stud having an end pivotally connected to the end of one of said inner and outer arms, the other of said inner and outer arms including a hole for receiving an opposite end portion of said stud, and an internally threaded member which threads onto said end portion of said stud to selectively retain said hinge assembly in either the extended position or the collapsed position.

16. A saw guide according to claim 15, wherein the hinge assembly further includes a compression spring disposed about the end portion of the stud to permit movement between the extended and collapsed positions without adjusting the internally threaded member.

17. A saw guide according to claim 15, wherein the hinge assembly includes respective pivot and fixed blocks affixed to the respective ends of the inner and outer arms, said pivot block having a slot for receiving the end of the stud and a transverse bore receiving a pin to which said end of said stud is affixed, said fixed block including a central hole through which the end portion of said stud extends.

18. A saw guide according to claim 17, wherein the pivot block is affixed to the inner arm, and the fixed block is affixed to the outer arm.

19. A saw guide according to claim 17, wherein the pivot block includes an angled outer surface adapted to engage the fixed block during hinging movement to facilitate such hinging movement.

20. A saw guide for use with a hand-held power saw of the type having a moving blade and a parallel guide edge used for cutting sheet and stock material having an upper surface and an outer edge, the saw guide being affixable on the upper surface of the material using a clamp, the saw guide being used to guide the power saw when cutting the material, comprising:

a first arm (44) intended to rest on the upper surface of a sheet of material and to engage the edge of the material, said first arm having a straight edge section adapted to abut the edge of the material;

an elongated variable angle second arm (62) intended to rest on the upper surface of the material, said second arm having an elongated, straight saw guide surface for engaging an edge of a power saw when cutting the material;

an elongated variable angle third arm (65) intended to rest on the upper surface of the material, said third arm having an elongated, straight saw guide surface for engaging an edge of the power saw when cutting the material;

a locking device pivotally connecting an outer end of said second arm and an inner end of the third arm for pivotal motion about a common pivot axis toward either a first position in which the third arm forms a linear extension of the first arm, or a second position in which the third arm is disposed parallel to the second arm; and a second locking device pivotally connecting an inner end of the first arm to an inner end of the second arm, such that the first arm is pivotal toward either a first position of the second arm; or a second position in which the first arm is disposed at a selected angular position with respect to the second arm, or the first arm is parallel to the second arm;

a gear plate having an edge with a series of teeth disposed in a curved array, and means attaching the gear plate to either the first or the second of said arms, the gear plate having a planar surface and a pivot receiving opening;

a pivot pin disposed in said pivot receiving opening whereby the gear plate is pivotal about said pivot pin axis;

a pawl having a tooth engageable with a selected position engageable with said gear plate teeth, means supporting the pawl in the other of said first or second arms, for pivotal motion about said pivot pin and parallel to the planar surface of the gear plate toward either a release position or a locking position by a motion parallel to the axis of the pivot pin; and bias means disposed between said first and second arms to bias the pawl toward a selected position in the gear plate teeth.

\* \* \* \* \*